US009344256B2

(12) United States Patent
Thubert et al.

(10) Patent No.: US 9,344,256 B2
(45) Date of Patent: May 17, 2016

(54) DOMINATING SET IDENTIFICATION FOR PATH COMPUTATION BASED ON DIRECTED ACYCLIC GRAPH MEMBERSHIP

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 14/030,949

(22) Filed: Sep. 18, 2013

(65) Prior Publication Data

US 2015/0078204 A1 Mar. 19, 2015

(51) Int. Cl.
*H04L 5/00* (2006.01)
*H04L 12/721* (2013.01)
*H04W 40/12* (2009.01)
*H04L 12/717* (2013.01)
*H04W 84/18* (2009.01)

(52) U.S. Cl.
CPC .............. *H04L 5/0067* (2013.01); *H04L 45/12* (2013.01); *H04L 45/42* (2013.01); *H04W 40/12* (2013.01); *H04W 84/18* (2013.01)

(58) Field of Classification Search
CPC ..... H04L 41/12; H04L 45/02; H04L 67/1061; H04L 12/4604
See application file for complete search history.

(56) References Cited

U.S. PATENT DOCUMENTS

| 6,628,643 | B1* | 9/2003 | Park et al. ...................... 370/351 |
| 7,366,111 | B2 | 4/2008 | Thubert et al. |
| 7,369,512 | B1 | 5/2008 | Shurbanov et al. |
| 7,860,025 | B2 | 12/2010 | Thubert et al. |
| 8,102,775 | B2 | 1/2012 | Thubert |
| 2011/0216656 | A1 | 9/2011 | Pratt, Jr. et al. |
| 2012/0213124 | A1* | 8/2012 | Vasseur et al. ................ 370/255 |
| 2012/0300668 | A1 | 11/2012 | Thubert et al. |
| 2013/0089002 | A1* | 4/2013 | Young et al. ................... 370/255 |

OTHER PUBLICATIONS

Thubert et al., "IETF 6TSCH:Combining IPv6 Connectivity with Industrial Performance", International Workshop on Extending Seamlessly to the Internet of Things (esIoT), [online], Taiwan, Jul. 3-5, 2013, 6 pages.
Thubert et al., "An Architecture for IPv6 over Time Slotted Channel Hopping", [online], Apr. 19, 2013, [retrieved on May 24, 2013]. Retrieved from the Internet: <URL: http://tools.ietf.org/html/draft-thubert-6tsch-architecture>, 6TSCH, Internet Draft, pp. 1-12.

(Continued)

*Primary Examiner* — Alvin Zhu
(74) *Attorney, Agent, or Firm* — Leon R. Turkevich

(57) ABSTRACT

In one embodiment, a method comprises a path computation device receiving device information from member network devices, each member network device belonging to a directed acyclic graph to a destination in a low power lossy network; and the path computation device classifying each member network device belonging to a directed acyclic graph as belonging to a dominating set, for generation of optimized routes distinct from any directed acyclic graph, for reaching any one of the member network devices of the dominating set.

20 Claims, 4 Drawing Sheets

(56) References Cited

OTHER PUBLICATIONS

Watteyne et al., "Using IEEE802.15.4e TSCH in an LLN context: Overview, Problem Statement and Goals", [online], May 23, 2013, [retrieved on May 24, 2013]. Retrieved from the Internet: <URL: http://tools.ietf.org/html/draft-watteyne-6tsch-tsch-lln-context>, pp. 1-23.

Vasseur et al., "RPL: The IP routing protocol designed for low power and lossy networks", Internet Protocol for Smart Objects (IPSO) Alliance, [online], Apr. 2011, [retrieved on Sep. 6, 2013]. Retrieved from the Internet: <URL: http://www.cs.berkeley.edu/~jwhui/6lowpan/IPSO-WP-7.pdf>, 20 pages.

Farrel et al., "A Path Computation Element (PCE)-Based Architecture", Network Working Group, Request for Comments: 4655, Aug. 2006, 40 pages.

Winter et al., "RPL: IPv6 Routing Protocol for Low-Power and Lossy Networks", Internet Engineering Task Force (IETF), Request for Comments: 6550, Mar. 2012, pp. 1-157.

Thubert, Ed., "Objective Function Zero for the Routing Protocol for Low-Power and Lossy Networks (RPL)", Internet Engineering Task Force (IETF), Request for Comments: 6552, Mar. 2012, 14 pages.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

\* cited by examiner

US 9,344,256 B2

DOMINATING SET IDENTIFICATION FOR PATH COMPUTATION BASED ON DIRECTED ACYCLIC GRAPH MEMBERSHIP

TECHNICAL FIELD

The present disclosure generally relates to a Path Computation Element (PCE) optimizing time-slotted channel hopping routes between network devices in a device network having a large number of network devices, for example a lower power lossy network (LLN) having (tens of) thousands of sensor devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs) allow a large number (e.g., tens of thousands) of resource-constrained devices to be interconnected to form a wireless mesh network. The Internet Engineering Task Force (IETF) has proposed a routing protocol ("6TiSCH") that provides IPv6 routing using time slotted channel hopping (TSCH) based on IEEE 802.15.4e. Although a centralized entity such as a Path Computation Entity (PCE) can be used for route calculation between a small number of different network devices, the complexity in calculating a TSCH schedule by the PCE limits the number of network devices to less than one hundred (100) within the network, or more typically no more than about thirty (30) network devices, as the PCE is incapable of maintaining the peerings between a larger number of network devices. Hence, a PCE is incapable of calculating 6TiSCH routes between network devices in a data network containing a larger number of network devices.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises a path computation device receiving device information from member network devices, each member network device belonging to a directed acyclic graph to a destination in a low power lossy network; and the path computation device classifying each member network device belonging to a directed acyclic graph as belonging to a dominating set, for generation of optimized routes distinct from any directed acyclic graph, for reaching any one of the member network devices of the dominating set.

In another embodiment, an apparatus comprises a network interface circuit and a processor circuit. The network interface circuit is configured for receiving device information from member network devices, each member network device belonging to a directed acyclic graph to a destination in a low power lossy network. The processor circuit is configured for classifying each member network device belonging to a directed acyclic graph as belonging to a dominating set, for generation of optimized routes distinct from any directed acyclic graph, for reaching any one of the member network devices of the dominating set.

In another embodiment, a method comprises a network device in a low power lossy network joining a directed acyclic graph to a destination; and the network device sending device information to a path computation device in response to joining the directed acyclic graph, enabling the path computation device to add the network device to a dominating set of network devices for generation by the path computation device of optimized routes for reaching any network device in the lower power lossy network, the optimized routes distinct from any directed acyclic graph.

DETAILED DESCRIPTION

Figure 1:
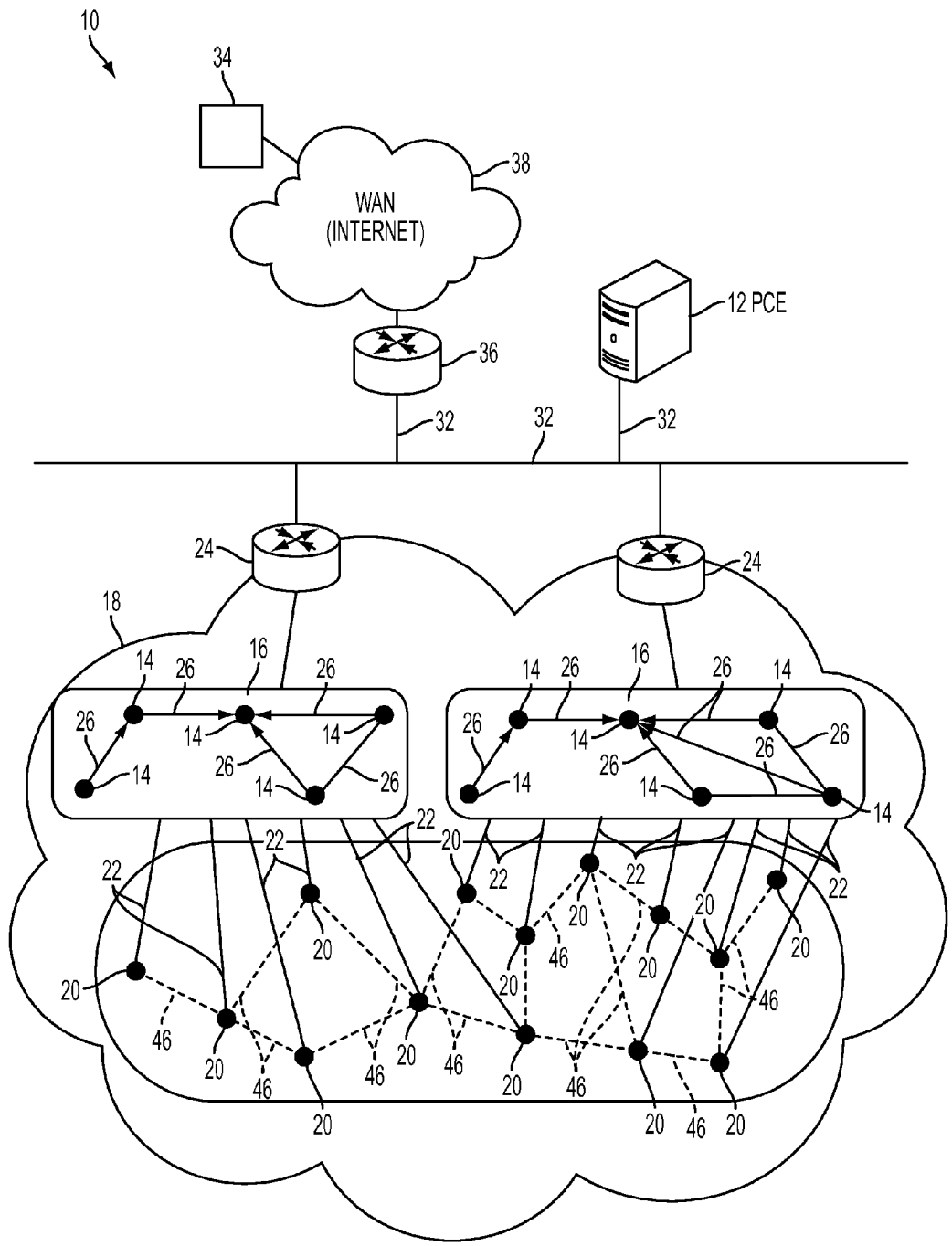
FIG. 1 illustrates an example system having an apparatus for classifying network devices belonging to a directed acyclic graph as belonging to a dominating set for generation of optimized routes within a network, according to an example embodiment.

FIG. 1 illustrates an example system 10 having an apparatus 12 for classifying network devices 14 belonging to a directed acyclic graph (DAG) 16 as belonging to a dominating set (28 of FIG. 2) for generation of optimized routes (30 of FIG. 2) within a network 18, according to an example embodiment.

Particular embodiments enable an efficient identification of network devices 14 to be used by a Path Computation Element (PCE) device 12 for generation of optimized time-slotted channel-mapped routes 30 in a lower power lossy network 18 that can contain tens of thousands of network devices 14, 20, based on using network devices 14 that are members of a DAG 16. Use of time-slotted channel-mapped routes in a network 18 (e.g., according to 6TiSCH) requires all network devices 14 along the time-slotted channel-mapped routes to be time synchronized across multiple distinct frequency channels to establish a deterministic network for transport of data flows. A "deterministic network" is a data network that can guarantee allocation of network resources (e.g., data buffers, processor capacity, network medium access, etc.) at the precise time that the network resources are needed. Hence, a data packet for an identified data flow that needs to be transmitted from a network device "A" 14 to a network device "C" 14 via network device "B" 14 can be allocated a prescribed 6TiSCH time-slotted channel-mapped route (or "track") having the sequence of network device "A" transmitting the data packet to network device "B" at time slot "t0" on frequency channel "10", followed by network device "B" transmitting the data packet to network device "C" at time slot "t1" on frequency channel "3". The term "track" is defined as a deterministic sequence of frequency channels mapped along a multi-hop path synchronized by a sequence of time slots: the "sequence of time slots" can include one or more retry slots for retransmission attempt (e.g. one retry slot for each hop), and the multi-hop path can be implemented according to varying topologies, for example an arc chain and frame replication as described in U.S. Patent Publication No. 2012/0300668.

As apparent from the foregoing, the relative complexity in calculating time-slotted channel-mapped routes 30 in a deterministic network is not scalable for a PCE device 12, especially as numerous optimization constraints (e.g., latency, throughput, minimized error rate, etc.) can result in an NP-complete problem (nondeterministic polynomial time) that causes an exponential increase in the computational cost of finding an acceptable solution for an increasing number of constrained paths as the number of network devices 14, 20 increases.

Particular embodiments enable the efficient identification of network devices to be used for calculation of the optimized time-slotted channel-mapped routes 30 in a lower power lossy network 18, based on classifying any member network devices 14 belonging to a directed acyclic graph 16 to a prescribed destination as belonging to a Dominating Set (DS) 28 of network devices for calculation of the optimized time-slotted channel-mapped routes 30. A "Dominating Set" is an identifiable set of connected network devices in a network, where any network device in the network either is a member 14 of the dominating set, or a "leaf network device" 20 that is one and only one hop away from a member 14 of the dominating set (i.e., "member network device") via a data link 22. The term "leaf network device" as used in herein (and in the claims) is defined as a network device that: (1) is attached to a member network device 14 of a directed acyclic graph 16; and (2) that does have any "children" attached to it. In other words, as described below with respect to operation 54, that status of a network device (e.g., "X") can change from "leaf network device" to "member network device" if another network device (e.g., "Y") attaches to the network device "X". Hence, each and every leaf network device 20 is a neighbor with one or more member network devices 14 via a corresponding data link 22, and each member device 14 can provide reachability to any other network device 14, 20 in the network 18. FIG. 1 illustrates the data link 22 for a leaf network device 20 in communication with a directed acyclic graph 16 generally for simplicity: it will be readily apparent that the actual data link 22 will be between the leaf network device 20 and one or more of the member network devices 14.

Moreover, particular embodiments enable any network device 14 that creates or joins a DAG 16 to a destination (e.g., a backbone router) 24 to send device information to the PCE device 12 (e.g., via a wired data link 32) in response to joining the DAG 16, including a unique device identifier and device link information regarding any data link 22, 26 used by the member network device 14 for connecting to any other network device 14, 20 in the network 18. As described for example in RFC 6550, U.S. Publication No. 2012/0300668, and/or U.S. Pat. No. 7,860,025, each network device 14 can independently decide to create and/or join a directed acyclic graph (DAG) 16 according to prescribed constraints or parameters that enable optimization of the DAG 16 according to the prescribed parameters: the optimization of the DAG 16 according to prescribed parameters also is referred to as an "objective function" in RFC 6550. Since the member network devices 14 establish a DAG 16 based on distributed computing among the member network devices 14, the identification of the member network devices 14 and the associated data links 22, 26 provided by the member network devices 14 enable the PCE 12 to classify each member network device 14 as belonging to a dominating set 28, for generation of optimized routes 30.

Hence, the member network devices 14 of a directed acyclic graph 16 represent an initial optimized topology (according to a prescribed Objective Function) overlying the link layer mesh network that is a subset of the total population of network devices 14, 20 in the network 18, where the total number of member network devices 14 can be one or more orders of magnitude smaller than the total number of leaf network devices 20.

Figure 2:
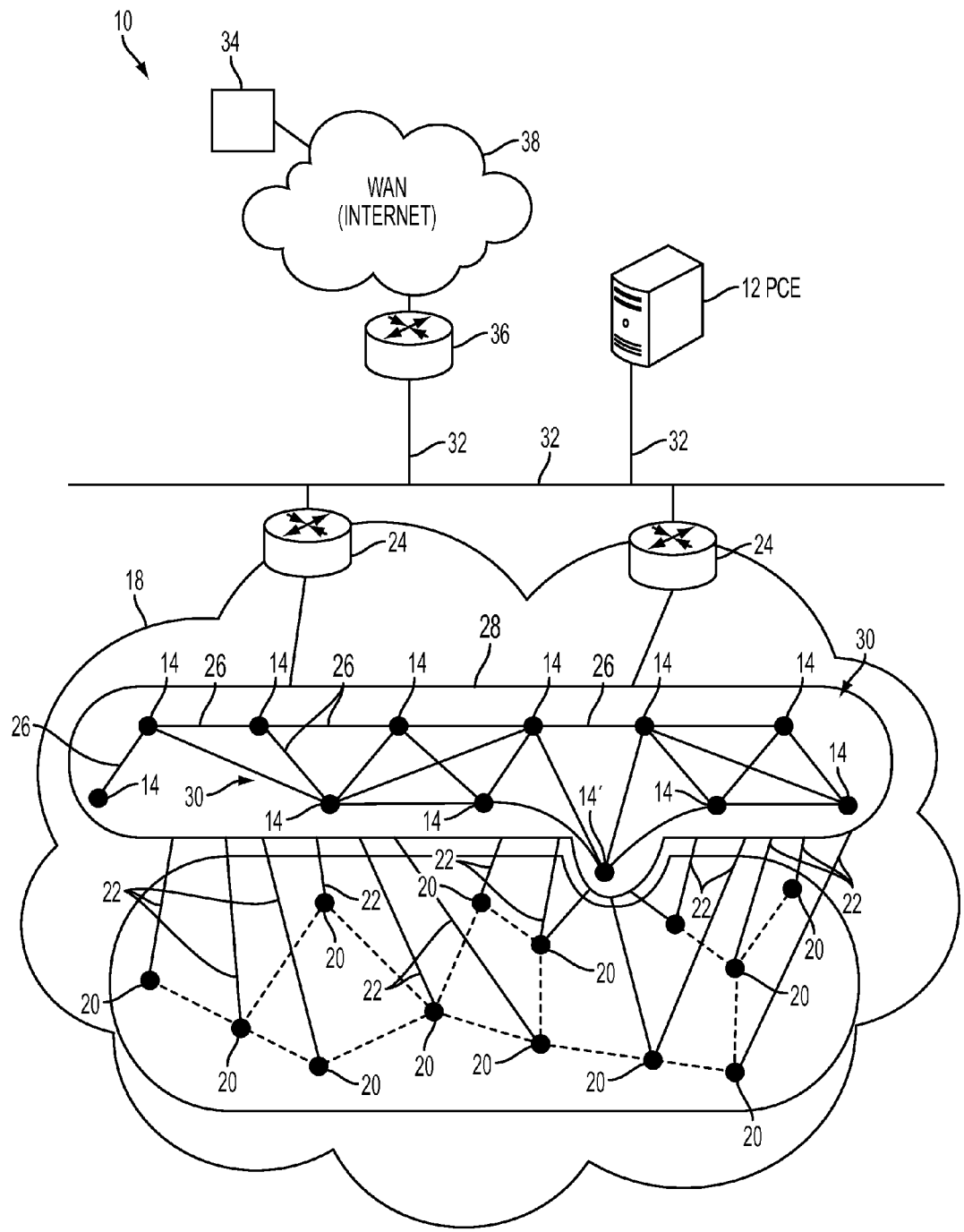
FIG. 2 illustrates an example dominating set of network devices having optimized routes within the network of FIG. 1, according to an example embodiment.

Consequently, the PCE device 12 can generate the optimized routes 30 using a further optimization for the low power lossy network 18 based on the substantially smaller subset of member network devices 14, ensuring scalability in generating the optimized routes 30 by the PCE device 12. As illustrated in FIGS. 1 and 2, the optimized routes 30 are distinct from the DAGs 16, and the optimized routes 30 enable the network devices 14, 20 to send and receive data flows within the low power lossy network 18. The data flows from the low power lossy network 18 also can be sent to and from a remote computing device 34 via a network router device 36 and a wide area network (e.g., the Internet) 38.

Figure 3:
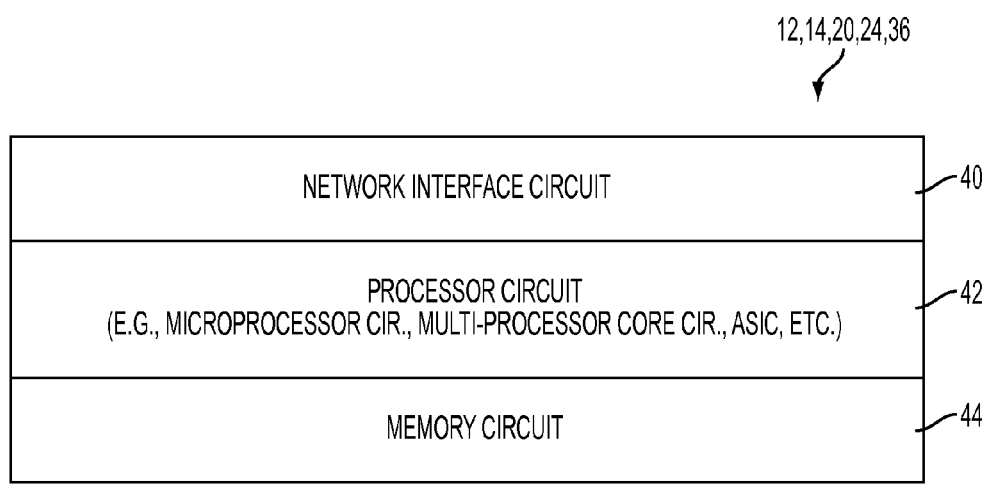
FIG. 3 illustrates an example implementation of any one of the network devices or the path computation device of FIG. 1, according to an example embodiment.

FIG. 3 is a diagram illustrating an example implementation of any one of the PCE device 12, the network devices 14, 20, and or the router devices 24 or 36, according to an example embodiment. The apparatus of FIG. 3 (e.g., 12, 14, 20, 24, and/or 36) is a physical machine (i.e., a hardware device) configured for implementing network communications with other physical machines via a data network 18. The apparatus of FIG. 3 (e.g., 12, 14, 20, 24, and/or 36) can include one or more network interface circuits 40, one or more processor circuits 42, and one or more memory circuits 44, described in further detail below.

Any of the disclosed circuits (including the network interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network device via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 23 can be implemented dynamically by the processor circuit 42, for example based on memory address assignment and partitioning executed by the processor circuit 42.

Figure 4:
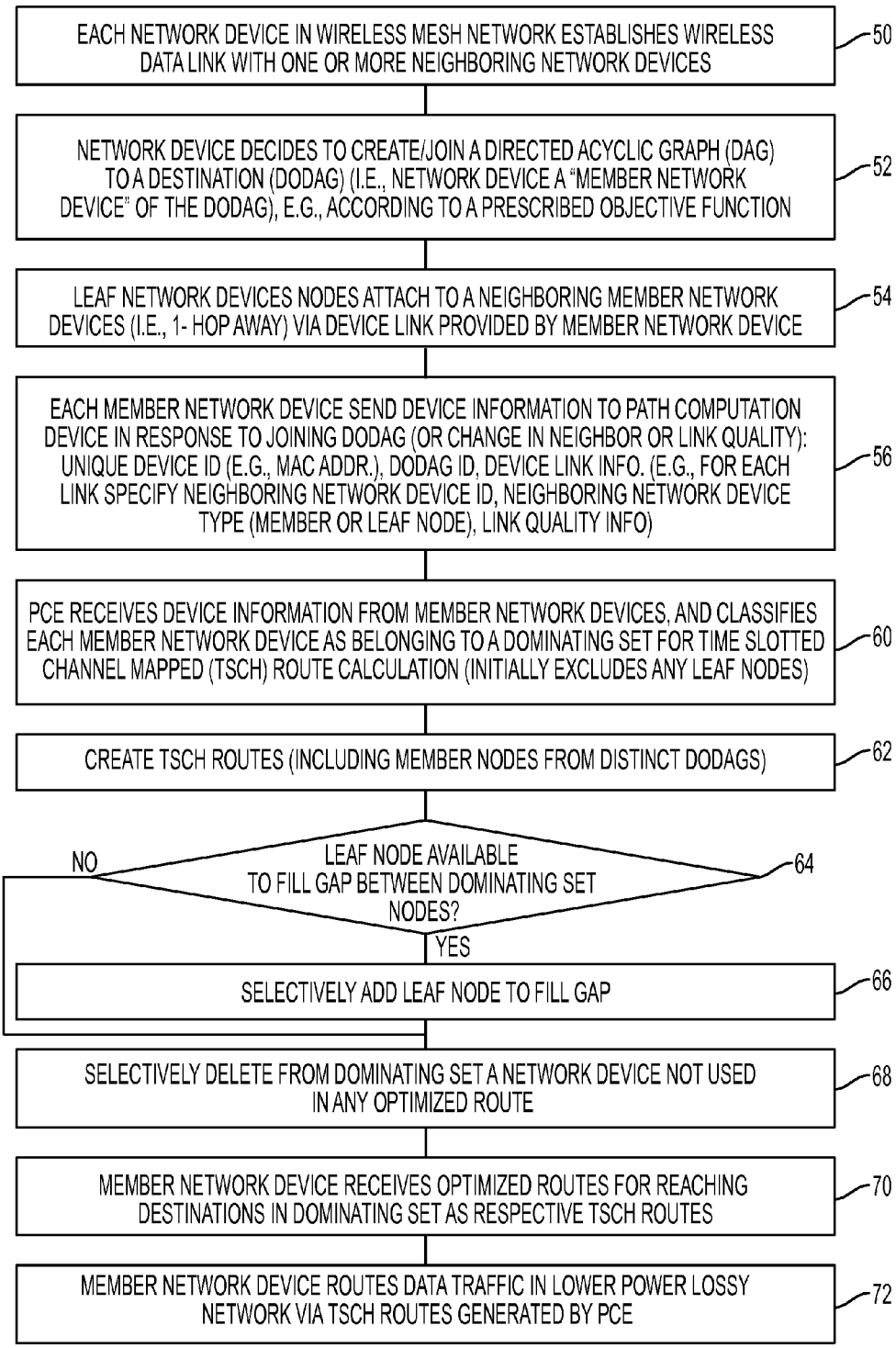
FIG. 4 illustrates an example method of the network devices and the path computation device of FIG. 1 causing the generation of optimized routes within a lower power lossy network, according to an example embodiment.

FIG. 4 illustrates an example method of the network devices 14 and the path computation device 12 of FIGS. 1 and 2 causing the generation of optimized routes 30 within a lower power lossy network 18, according to an example embodiment. The operations described with respect to any of the FIGS. 1-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 50 of FIG. 4, the network interface circuit 40 of each network device 14, 20 in the wireless mesh network 18 can establish one or more wireless data links, illustrated in FIGS. 1 and 2 as 22, 26, and/or 46. Hence, each network device 14, 20 has at least one link layer connection with another network device to form a mesh network.

In operation 52 the processor circuit 42 of a subset of the network devices in the network 18 can decide to join and/or create a directed acyclic graph 16, for example according to RFC 6550 and/or U.S. Pat. No. 7,860,025, for example based on exchanging neighbor advertisement messages, where one of the network devices advertises reachability to a destination root 24. As illustrated in FIG. 1, each network device 14 that joins a directed acyclic graph (DAG) 16 toward a destination 24 can selectively choose its connections within the directed acyclic graph 16 according to a prescribed objective function.

The processor circuit 42 of certain network devices 20 can decide in operation 54 to attach to a neighboring member network device 14 that is one hop away via a device link 22 provided by the member network device 14. Hence, in one embodiment each network device can decide whether to join as a member network device 14 to a directed acyclic graph 16, or to attach as a leaf network device 20 to a neighboring member network device 14.

A leaf network device 20 in operation 54 also can detect a change in its status (e.g., execute operation 52) to a member network device 14. For example, a leaf network device "X" 20 can advertise the DODAG 16 to which it has joined, for example outputting DODAG Information Objects (DIOs) as described RFC 6550. In response to the leaf network device "X" 20 detecting another leaf network device "Y" 20 has attached to it in order to join the advertised DODAG 16 (e.g., based on the leaf network device "Y" 20 sending to the network device "X" a Destination Advertisement Object (DIOs) as in RFC 6550 to request a schedule of unicast slots), the network device "X" 20 can detect that it has become a member network device 14, and in response execute the appropriate member network device operations, described below.

A member network device 14 also can detect a change in its status to a leaf network device 20, for example if it detects no other network devices 14, 20 are attached to it. Hence, the designation of "member network device" 14 or "leaf network device" 20 can change based on the attachment status of the network device within the topology of a DAG 16.

As described previously, the formation of directed acyclic graph 16 typically results in substantially fewer member network devices 14 and a higher number of leaf network devices 20.

The processor circuit 42 of each member network device 14 in operation 56 can send (via its network interface circuit 40) device information to the PCE device 12 (i.e., path computation device 12), for example via the corresponding DODAG 16. The processor circuit 42 of each member network device 14 can send the device information in response to joining the DODAG 16, and/or in response to a change in a detected neighbor, and/or in response to a change in a link quality (e.g., one of the links 22 and/or 26). Example device information can include a unique device identifier (e.g., a MAC address), an identifier for the DODAG 16 (e.g., a network address for the destination root 24), and device link information for each link of the member network device 14. Example device link information can include a device identifier for a neighboring network device 14 or 20, identification of the neighboring network device type (i.e., whether the neighboring device is a member network device 14 or a leaf network device 20). Example device link information also can include links quality information, for example link metrics as described in RFC 6551, ETX metrics (expected transmission count), received signal strength indicator (RSSI), Link Quality Indicator (LQI), etc.

The processor circuit 42 of each member network device 14 in operation 56 also can forward link information for neighbor links 46 utilized by leaf network devices 20 that transmit link quality information associated with the neighbor links 46 to the member network device 14 providing reachability for the leaf network device 20. As described below, the PCE device 12 can use the link information for the neighbor links 46 during optimization of the time-slotted channel mapped routes 30, for example upon making a decision to selectively add a leaf network device (14' of FIG. 2) to the dominating set 28 in order to fill a gap between dominating set network devices 14.

Hence, a member network device 14 can advertise all neighbor devices that are within a same RPL instance (as described in RFC 6550), regardless of whether the neighbor devices share the same DODAG identifier (i.e., regardless of whether the neighbor device belongs to another DODAG). As described below with respect to operation 62, this neighbor information regardless of whether the neighbor devices share the same DODAG identifier enables the creation of TSCH routes across multiple DAGs 16 based on classifying member network devices 14 from distinct DAGs 16 into the same dominating set 28.

The network interface circuit 40 of the PCE device 12 is configured for receiving in operation 60, via the data link 32 and a gateway 24, the device information transmitted by the member network devices 14 in operation 56. As described with respect to operation 56, the device information can identify the member network devices 14, the leaf network devices 20, and the associated data links 22, 26, and 46. The processor circuit 42 of the PCE device 12 is configured for classifying in operation 60 each member network device 14 as belonging to the dominating set 28 that is used in operation 62 by the processor circuit 42 of the PCE device 12 to generate the optimized time-slotted channel (TSCH) mapped routes 30 in operation 62. As illustrated in FIGS. 1 and 2, the optimized routes 30 are distinct from the DAGs 16.

As illustrated in operation 60, the processor circuit 42 of the PCE device 12 also is configured for excluding from the dominating set 28 any network device identified as not having any attached child network devices for reaching a directed acyclic graph 16 in the network 18, namely the leaf network devices 20. Hence, the PCE device 12 can generate the optimized routes 30 in a scalable manner using only the member network devices 14 and excluding any of the leaf network devices 20. As illustrated in operation 62, the PCE device 12 can classify (i.e., add) into the dominating set 28 member network devices 14 from distinct DODAGs 16, i.e., DAGs having distinct destinations 28. Hence, the optimized routes 30 generated by the PCE device 12 can combine member network devices 14 from different DODAGs 16.

The processor circuit 42 of the PCE device 12 also can be configured for selectively adding in operation 66 a leaf network device (14' of FIG. 2) to the dominating set 28 in response to detecting in operation 64 that a gap exists between dominating set network devices 14. Similarly, the processor circuit 42 of the PCE device 12 can be configured for selectively deleting from the dominating set 28 in operation 68 a network device 14 that is not used in any of the optimized routes 30.

Each member network device 14 in operation 70 can receive from the PCE device 12 one or more time-slotted channel mapped routes for reaching respective destinations in the dominating set 28 (and attached leaf network devices 20) in the network 18. Hence, each network device 14 in operation 72 can route data traffic in the lower power lossy network 18 according to the TSCH routes 30 generated by the PCE device 12.

According to example embodiments, a PCE device 12 can generate time slotted channel mapped routes for a low power lossy network having tens of thousands of network devices, based on classifying only a subset of the network devices as a dominating set based on the subset of network devices being member network devices of a directed acyclic graph. The use of member network devices from a directed acyclic graph and the deliberate excluding of leaf network devices enables optimization in a low power lossy network, for example a sensor network having tens of thousands of network devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    a path computation device receiving device information from member network devices, each member network device belonging to a directed acyclic graph to a destination in a low power lossy network; and
    the path computation device classifying each member network device belonging to any directed acyclic graph as belonging to a dominating set, for generation of optimized routes distinct from any directed acyclic graph, for reaching any one of the member network devices of the dominating set.

2. The method of claim 1, further comprising the path computation device excluding from the dominating set any network device identified as not having any attached child network devices for reaching a directed acyclic graph in the network.

3. The method of claim 2, wherein each network device excluded from the dominating set is a leaf network device one hop away from one of the members of the dominating set.

4. The method of claim 1, wherein the classifying includes the path computation device classifying into the dominating set member network devices from distinct directed acyclic graphs, at least one of the optimized routes including member network devices from distinct directed acyclic graphs.

5. The method of claim 1, wherein the device information from a member network device includes a unique device identifier and device link information, the device link information including identification of any neighboring network devices of the member network device.

6. The method of claim 5, wherein the device link information further includes link quality information for each device link used by the corresponding member network device.

7. The method of claim 5, wherein each neighboring network device is identified in the device information as one of a member network device or a leaf network device that does not have any attached child network device for reaching a directed acyclic graph.

8. The method of claim 7, wherein:
    the classifying includes the path computation device selectively adding one of the leaf network devices to the dominating set for addition to one or more of the optimized routes between two member network devices of the dominating set;
    the method further comprising the path computation device selectively deleting from the dominating set any network device that is not used in any of the optimized routes.

9. The method of claim 1, further comprising generating the optimized routes as time-slotted channel mapped routes for execution by the member network devices.

10. An apparatus comprising:
    a network interface circuit configured for receiving device information from member network devices, each member network device belonging to a directed acyclic graph to a destination in a low power lossy network; and
    a processor circuit configured for classifying each member network device belonging to any directed acyclic graph as belonging to a dominating set, for generation of optimized routes distinct from any directed acyclic graph, for reaching any one of the member network devices of the dominating set.

11. The apparatus of claim 10, wherein the processor circuit is configured excluding from the dominating set any network device identified as not having any attached child network devices for reaching a directed acyclic graph in the network.

12. The apparatus of claim 10, wherein the processor circuit is configured generating the optimized routes as time-slotted channel mapped routes for execution by the member network devices.

13. Logic encoded in one or more non-transitory tangible media for execution and when executed by a machine operable for:
a path computation device receiving device information from member network devices, each member network device belonging to a directed acyclic graph to a destination in a low power lossy network; and
the path computation device classifying each member network device belonging to any directed acyclic graph as belonging to a dominating set, for generation of optimized routes distinct from any directed acyclic graph, for reaching any one of the member network devices of the dominating set.

14. The logic of claim 13, further operable for generating the optimized routes as time-slotted channel mapped routes for execution by the member network devices.

15. A method comprising:
a network device in a low power lossy network joining a directed acyclic graph to a destination; and
the network device sending device information to a path computation device in response to joining the directed acyclic graph, enabling the path computation device to add the network device to a dominating set of network devices based on membership in the directed acyclic graph, for generation by the path computation device of optimized routes for reaching any network device in the lower power lossy network via one or more of the network devices in the dominating set, the optimized routes distinct from any directed acyclic graph.

16. The method of claim 15, wherein the device information includes a unique device identifier and device link information, the device link information including identification of any neighboring network devices of the network device.

17. The method of claim 16, wherein the device link information further includes link quality information for each device link used by the corresponding network device, each neighboring network device identified in the device information as one of a member network device belonging to a directed acyclic graph or a leaf network device that does not have any attached child network device for reaching a directed acyclic graph.

18. The method of claim 15, further comprising the network device receiving from the path computation device one or more optimized routes as time-slotted channel mapped routes for reaching respective destinations in the low power lossy network.

19. Logic encoded in one or more non-transitory tangible media for execution and when executed by a machine operable for:
a network device in a low power lossy network joining a directed acyclic graph to a destination; and
the network device sending device information to a path computation device in response to joining the directed acyclic graph, enabling the path computation device to add the network device to a dominating set of network devices based on membership in the directed acyclic graph, for generation by the path computation device of optimized routes for reaching any network device in the lower power lossy network via one or more of the network devices in the dominating set, the optimized routes distinct from any directed acyclic graph.

20. The logic of claim 19, further operable for the network device receiving from the path computation device one or more optimized routes as time-slotted channel mapped routes for reaching respective destinations in the low power lossy network.

* * * * *